United States Patent [19]
Furukawa et al.

[11] Patent Number: 5,796,888
[45] Date of Patent: Aug. 18, 1998

[54] OPTICAL SWITCH APPARATUS

[75] Inventors: Tohru Furukawa; Yoshikazu Nomura, both of Sakura; Hiroshi Furukawa, Yotsukaido; Naoki Nakao, Tokyo; Nobuo Tomita, Higashi-Ibaraki-gun, all of Japan

[73] Assignees: Fujikura Ltd.; Nippon Telegraph and Telephone Corporation, both of Tokyo, Japan

[21] Appl. No.: 718,712

[22] Filed: Sep. 24, 1996

[30] Foreign Application Priority Data

Sep. 25, 1995 [JP] Japan .................. 7-246514
Aug. 7, 1996 [JP] Japan .................. 8-208674

[51] Int. Cl.$^6$ .................................................. G02B 6/35
[52] U.S. Cl. .................................................. 385/22; 385/20
[58] Field of Search ........................... 385/15, 16, 20, 385/23

[56] References Cited

U.S. PATENT DOCUMENTS

| | | | |
|---|---|---|---|
| 5,386,485 | 1/1995 | Saito et al. | 385/20 X |
| 5,446,810 | 8/1995 | Watanabe et al. | 385/22 |
| 5,483,608 | 1/1996 | Yokomachi et al. | 385/22 |
| 5,623,562 | 4/1997 | Anderson et al. | 385/16 |

FOREIGN PATENT DOCUMENTS

| | | |
|---|---|---|
| 07043624 A | 2/1995 | Japan . |
| 07064000 A | 3/1995 | Japan . |
| 07181405 A | 7/1995 | Japan . |
| 08184768 A | 7/1996 | Japan . |

*Primary Examiner*—John D. Lee
*Attorney, Agent, or Firm*—Finnegan, Henderson, Farabow, Garrett & Dunner, L.L.P.

[57] ABSTRACT

According to the present invention, an optical switch apparatus is provided for switching the connections between a plurality of fixed optical fibers which are fixed and arranged on an optical fiber support base within a container filled with an index-of-refraction matching agent, and movable optical fibers provided on a movable base which is moved by a moving mechanism comprising a worm gear within the aforementioned container. In addition, a worm gear driving member and a cam driving member of a matching device are both provided on the exterior of the aforementioned container via a seal. This worm gear driving member which is connected to a control device, starts the positioning sequence and moves the movable base to a standby position following return of the movable base to a predetermined origin within the container. As a result, it is possible to prevent contamination of the index-of-refraction matching agent over a long period of time, and thereby reduce the connection loss to a satisfactory level. In addition, since the driving precision of the movable base is also improved, it is possible to achieve superior effects such as reduction of the array pitch of the fixed optical fibers, improvement of the precision and increase in the multiplicity of the optical switch apparatus.

9 Claims, 5 Drawing Sheets

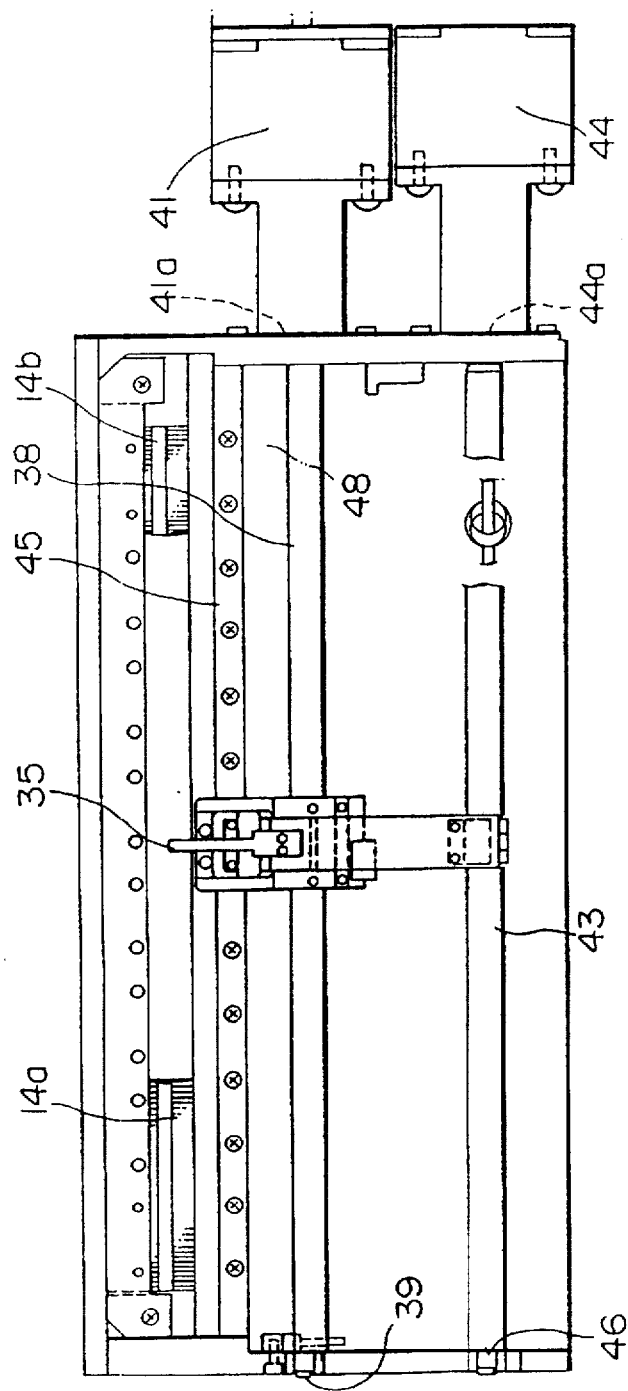
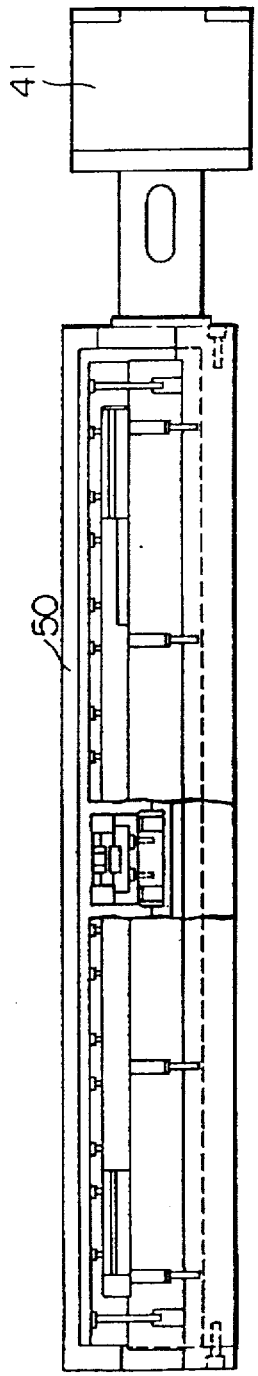
FIG.3A
FIG.3B

OPTICAL SWITCH APPARATUS

BACKGROUND OF THE INVENTION

1. Field of the Invention

The present invention relates to an optical switch apparatus for positioning and connecting optical fibers on a V-grooved base.

2. Relevant Art

Recently, as communication circuits for linking large numbers of companies and individual subscribers over a wide area, large scale optical communication networks are being constructed. Characteristically, these subscriber-type optical communication networks possess extremely large numbers of conductors, as well as enormous numbers of terminals to be connected. Hence, there exists a demand for an optical fiber automatic optical switch device for switching the connections between these terminals.

In general, optical switches exhibit a wide variety of uses, not only in terminal switching, but also in currently employed auxiliary switching, transmission route network control, optical exchange devices and the like. These devices represent mechanical optical switch models for carrying out switching of optical paths by means of mechanically driving optical components such as optical fibers, prisms and the like, or non-mechanical optical switch models for carrying out switching of optical paths by means of utilizing electro-optical effects, magneto-optical effects, acoustic-optical effects and the like.

Among these mechanical optical switches, an optical switch which mechanically drives optical fibers characteristically displays little connection and/or crosstalk loss, in addition to the ability to exhibit a large extinction ratio. Hence, a superior optical switch is conceivable by means of improving the slow switch response time which serves as a problematic aspect of this type of optical switch.

As a result, experimental improvements on optical switches have been undertaken as illustrated by the following prototype models. Specifically, in order to change the connections between a large number of optical fibers, an M×N switch (where M and N are natural numbers) exists which identifies one fixed optical fiber from among a plurality of fixed optical fibers comprising a large number of terminals each corresponding to a subscriber, and then connects this identified fixed optical fiber to a movable optical fiber. Although various methods for executing this connection exist, in order to be able to complete the connection in a short amount of time, a matching device is employed by means of which a precise connection can be easily carried out on a V-shaped groove.

More concretely, a plurality of optical fibers corresponding to the subscriber terminals are fixed in a parallel array onto V-shaped grooves which serve as positioning grooves. A movable optical fiber for use in connection is placed in a standby manner at a position only slightly higher than the aforementioned optical fibers. With regard to the method of connection, the connection is conducted by moving this movable optical fiber into a position directly above the end face of the target optical fiber for connection, and then depressing the connection terminal of the movable optical fiber down onto a V-shaped groove. In order to pre-apply an index-of-refraction matching agent to the connection ends, the entire apparatus is immersed in the index-of-refraction matching agent, e.g., a silicone oil, beforehand.

FIG. 5 is a diagram showing an outline of the optical switch possessing the aforementioned experimental connection apparatus. In FIG. 5, an optical switch apparatus 10 is provided which is housed in a container 12 filled with silicone oil 13, which serves as the index-of-refraction matching agent. A plurality of fixed optical fibers 15, to serve as connection targets, extending into container 12 from an exterior terminal board, are positioned and fixed in a parallel array on top of a V-groove base 14 possessing a plurality of V-shaped grooves 14a for use in positioning which are immersed in silicone oil. On the other hand, movable optical fiber 16 rests on top of a movable base 20, and is maintained in a standby position with the front end face (i.e., tip) located just above the end face of a fixed optical fiber.

Movable base 20 is set onto rail 21 and possesses a screw aperture 27a through which the moving means, worm gear 27, is inserted in a rotatable manner. One end of worm gear 27 is supported by means of ball bearing 27b which is provided in a wall portion 12a of the aforementioned container 12. In addition, the other end of worm gear 27 is coupled to the driving portion, motor 28, of said moving means. In this manner, by rotating worm gear 27 by means of motor 28, movable base 20 is moved in the direction indicated by the double-headed arrow X—X (i.e., at right angles to V-shaped groove 14a). Furthermore, a pin aperture 23a is provided in a pair of projections 22, 22 which project from movable base 20. Pin 23 is inserted through both this pin aperture 23a and another aperture (not shown in the FIG.) provided in arm member 24 for pushing optical fibers 16. Arm 24 which serves as a matching device is installed into movable base 24 in a rotatable manner.

On the other hand, in order to push the tip of movable optical fiber 16 down, the tip (i.e., the front end on the V-shaped groove 14a side) of rotary arm member 24 comprises a tip member 24a manufactured from rubber, while a motor 26 for rotating a small screw 25 is provided in the rear end (i.e., the end opposite from V-shaped groove 14a side) of rotary arm member 24 for rotating this aforementioned screw 25. Hence, when screw 25 is rotated by means of motor 26, the rear end of arm member 24 screwed therein is raised upwards, while tip member 24a of arm member 24 is lowered. As a result, the tip of movable optical fiber 16 is depressed by means of tip member 24a of arm member 24. In this manner, movable optical fiber 16 is matched and connected to a fixed optical fiber 15 on top of a V-shaped groove 14a. In order to change the connection between optical fibers 15 and 16, after motor 26 is rotated in the reverse rotation thereby lowering the rear end of arm member 24 and raising tip member 24a of arm member 24, movable base 20 is repositioned and tip member 24a of arm member 24 is once again lowered in the above-described manner.

According to the aforementioned apparatus, optical fibers 15 and 16 are connected by means of moving, matching and positioning movable optical fiber 16 to the position of the desired fixed optical fiber 15 for connection, and then pushing movable optical fiber 16 therein on top of the corresponding V-shaped groove 14a. According to this method, it is possible to conduct the above connection in an extremely rapid manner, and at the same time, since the connection portions are immersed in the index-of-refraction matching agent 13, also obtain, on the average, excellent connection properties. However, although a reduced connection loss is achieved by means of immersing the connection in an extremely pure index-of-refraction matching agent 13, when the optical switching is continued over a long period of time, there exists a fear of problems arising which jeopardize the reliability of the apparatus, such as increasing optical connection loss, scattering of the connection properties upon switching and the like.

The main source of these problems is most likely due to the existence of contaminants in the silicone oil. In particular, since the various complex devices comprising the apparatus, including the driving source (particularly the motor 26), are immersed in the silicone oil, every time the positioning operation is repeated, metal abrasion powder generated from the axle and the like, or contaminants which could not be removed at the time of shipping are subsequently dispersed into the silicone oil. Furthermore, degradation of the properties of the driving source, particularly motor 26, immersed in the silicone oil are also problematic.

SUMMARY OF THE INVENTION

In consideration of the aforementioned problems, it is an object of the present invention to provide an optical switch apparatus which is capable of carrying out high speed switching such that a movable optical fiber is precisely matched and connected to a fixed optical fiber wherein there is no contamination of the index-of-refraction matching agent (silicone oil) over a long period of time. Consequently, a highly precise positioning is possible without any connection loss between the connected optical fibers, such that stable connection properties are maintained over a long period of time.

Accordingly, an optical switch apparatus is provided for matching and bringing into communicative proximity an end of a movable optical fiber and an end of a fixed optical fiber selected from among a plurality of fixed optical fibers, the optical switch apparatus comprising: a container containing an index-of-refraction matching agent for immersing a junction between a fixed optical fiber and a movable optical fiber in communicative proximity; a fixed optical fiber support means for supporting each end of the plurality of fixed optical fibers within the container so that each fixed optical fiber is matchable and able to be brought into communicative proximity to an end of the movable optical fiber; a movable optical fiber base means for moving an end of the movable optical fiber into a standby position for matching and into a proximal position in communicative proximity with a fixed optical fiber; a moving means for moving the movable optical fiber base means, the moving means comprising a worm gear installed in the movable base and a worm gear driving means for driving said worm gear; and a matching means for moving the movable optical fiber to a standby position, matching the movable optical fiber with a fixed optical fiber, and controlling the moving means to move the movable optical fiber base means to bring the movable optical fiber into communicative proximity with a fixed optical fiber; wherein the matching means comprises an arm member provided in the movable base in a rotatable manner, an off-center cam coupled to an end of the arm member for rotating the arm member, and a cam driving means for driving the off-center cam, such that both the worm gear driving means of the moving means and the cam driving means for rotating the arm member of the matching means are provided on the outside of the container via a seal.

According to this structure, the movable optical fiber supported by means of the movable base is selectively connected to the desired fixed optical fiber on the optical fiber support base by means of moving the movable base by controlling the driving of the worm gear driving means and the cam driving means. Thus, according to the optical switch apparatus of the present invention, a high precision matching is obtained, resulting in a stable, excellent connection between a fixed optical fiber and the movable optical fiber. In addition, the connection is immersed in a index-of-refraction matching agent, and thus, for example, even if a minute space occurs at the joint connection surface due to a small defect in the connection surface of the optical fibers, this minute space is filled by means of the index-of-refraction matching agent, thereby reducing connection loss.

In addition, according to the optical switch apparatus of the present invention, the movable optical fiber is moved immediately above the desired fixed optical fiber and depressed downward to form a connection between the movable optical fiber and fixed optical fiber. Thus, due to the extremely short time required to form the connection, a rapid response time is possible with regard to the optical switch. Furthermore, it is also possible to maintain the depressed movable optical fiber in a horizontal manner by means of the optical fiber support base. Moreover, since the connection is maintained in an index-of-refraction matching agent, there is little connection loss or crosstalk such that superior connection properties are obtained.

Furthermore, the optical switch apparatus of the present invention is essentially housed in an air-tight container with the motor (i.e., the source of contamination of the index-of-refraction matching agent) arranged outside of the container. Therefore, the realization of an inexpensive (i.e., inexpensive to manufacture) and highly reliable optical switch apparatus, in which an excellent connection and stable connection properties can be maintained over a long period of time, is possible without fear of contamination of the index-of-refraction matching agent.

In addition, according to the optical switch apparatus of the present invention, at the start of positioning the movable optical fibers, the movable base returns to a predetermined origin in the container before proceeding to a desired standby position. Consequently, the positioning accuracy of the movable base is improved by means of returning and precisely positioning the movable base at the origin; thus even in the case when conducting high speed switching, it is still possible to accurately maintain the moving precision of the movable base. As a result, superior effects are obtained such as an improvement in the reliability of the joint connection between the optical fibers, as well as further increase in the speed of switching.

BRIEF EXPLANATION OF THE DRAWINGS

FIG. 3A is a diagram showing the structural details of an optical switch apparatus according to the present invention.

FIG. 3B is a diagram showing the structural details of an optical switch apparatus according to the present invention.

DETAILED DESCRIPTION OF THE PREFERRED EMBODIMENTS

In the following, the preferred embodiments of an optical switch apparatus according to the present invention will be explained in detail with reference to the FIGS. 1–3.

Figure 1:
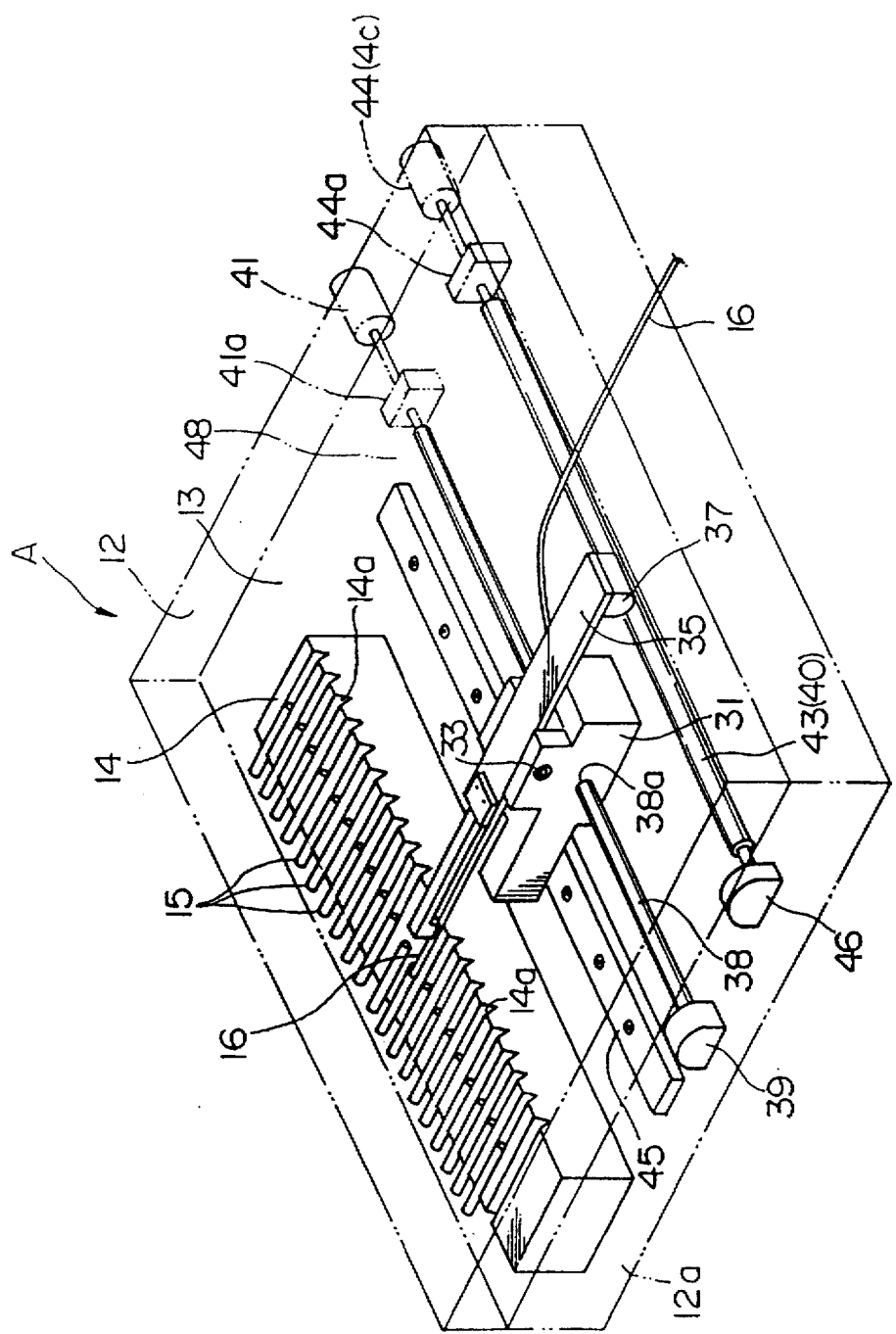
FIG. 1 is a diagram showing a general structure of an optical switch apparatus according to the present invention.
Figure 2:
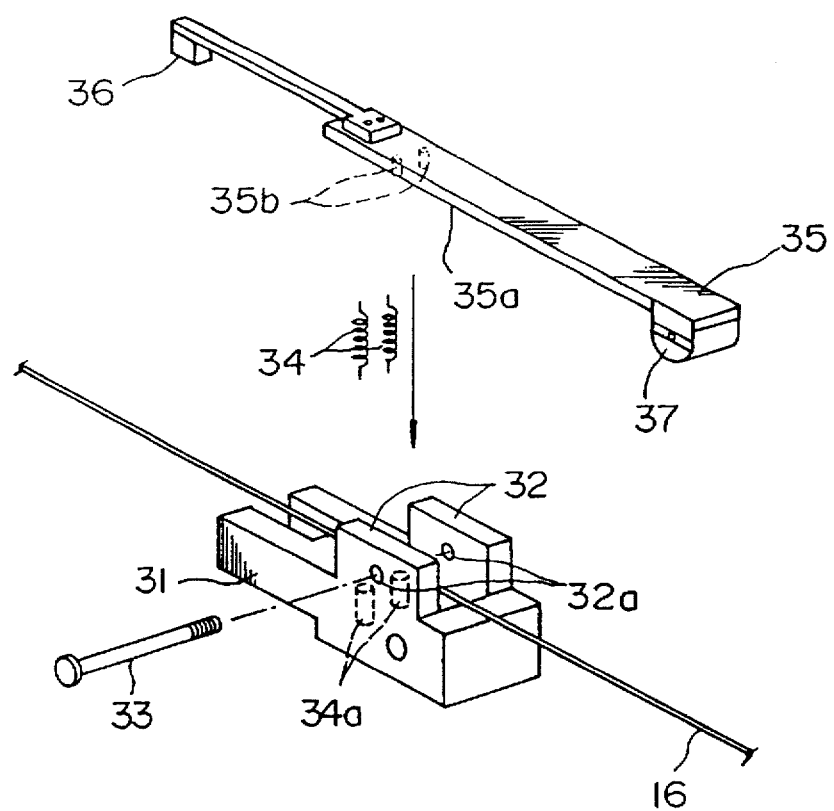
FIG. 2 is a diagram showing an exploded view of the main structural components, a movable base and arm member, of an optical switch apparatus according to the present invention.

According to an embodiment of the present invention, optical switch apparatus A, as shown in FIGS. 1–3, connects a movable optical fiber 16, while switching the position thereof, to a fixed optical fiber 15 selected from among a plurality of fixed optical fibers 15 corresponding to a plurality of subscriber terminals arranged in a parallel array on a plurality of V-shaped grooves 14a formed on V-groove base 14. According to the present embodiment, a container 12 is provided which houses V-groove base 14 onto which the aforementioned fixed optical fibers 15 are fixed in parallel array; a movable base 31 for maintaining and moving movable optical fiber 16 to a position from which contact with a predetermined fixed optical fiber 15 is possible; worm gear 38 (moving means) for moving movable base 31; and a matching device comprising arm member 35 for depressing movable optical fiber 16 downward and arm rotary member 40 for raising and lowering arm member 35. In order to raise and lower a tip of arm member 35, arm rotary member 40 comprises off-center cam 43 coupled to an end of arm member 35 and motor 44 for driving off-center cam 43. According to the present embodiment, V-groove base 14 serves as the positioning groove base. However, as the positioning groove base, it is also possible to utilize various cross-sectional forms such as U-shaped grooves and the like, as long as they are able to align and support the aforementioned fixed optical fibers 15.

FIG. 1 shows an optical switch apparatus A according to the present invention. In this figure, a movable base 31 for moving movable optical fiber 16, and an arm member 35 are provided. In addition, a screw aperture 38a is provided in the lower portion of movable base 31, and a worm gear 38 (i.e., moving means) for moving movable base 31 is screwed into screw aperture 38a such that rotation is possible thereof. One end of worm gear 38 is maintained in a rotatable manner in roller bearing 39 provided in a side wall 12a of container 12. The other end of worm gear 38 is inserted through the side wall opposite side wall 12a of container 12 via an oil seal 41a and coupled to motor 41 which serves as the worm gear driving member provided outside of container 12. In addition, movable base 31 is coupled to a linear guide rail 45, provided along the bottom of container 12 between worm gear 38 and V-shaped grooves 14a, upon which it moves horizontally.

In addition, two movable optical fibers 16, which maintain an optical fiber pitch via an MT connector (not shown in the figures) provided in movable base 31, rest on movable base 31. One end of movable optical fiber 16 is positioned and maintained immediately above an end face of a fixed optical fiber 15 on a V-shaped groove 14a at a position from which contact with the end face of fixed optical fiber 15 is possible. Furthermore, the other end of the movable optical fiber 16 extends out from movable base 31, penetrates through the container wall 12a facing opposite V-shaped grooves 14a to the exterior of container 12, and leads into an experimental optical pulse apparatus which is not shown in the figures.

FIG. 2 shows the structure of movable base 31 and arm member 35. A pair of protruding walls 32 and 32 protrude out from the middle of the upper surface of movable base 31 in which through holes 32a and 32a are provided. In addition, pin aperture 35a is provided in the central portion of arm member 32 comprising a part of the matching device for depressing and connecting the aforementioned movable optical fiber 16 to a fixed optical fiber 15. Hence, when pin aperture 35a of arm member 35 is matched with through holes 32a and 32a of the movable base 31 and pin 33 is inserted therein, arm member 35 is then connected to movable base 31 in a manner such that upward/downward (i.e., see-saw like) movement is possible using pin 33 as the fulcrum.

In order to depress movable optical fiber 16, a tip member 36 made from rubber is provided at the V-shaped groove 14a (front) end of arm member 35, while a coupling member 37, which is coupled to off-center cam 43, is formed at the (rear) end of arm member 35 opposite the aforementioned V-shaped grooves 14a. In addition, a pair of spring apertures 34a and 34a are provided in movable base 31, while another pair of spring apertures 35b and 35b is provided in arm member 35 at a position facing opposite the aforementioned pair of spring apertures 34a and 34a of movable base 31. A pair of springs 34 and 34 are inserted into these spring apertures such that when cam 43 is driven, the rear end of arm member 35 is returned to a horizontal position from the raised position (i.e., the front end of arm member 35 is in a depressed position) thereby similarly returning the depressed tip (front end) of arm member 35 to the horizontal position.

In the following, the raising/lowering movement of arm member 35 which is regulated by means of driving off-center cam 43, will be explained with reference to FIG. 4. As mentioned above, movable optical fiber 16 is designed to be depressed towards the V-shaped grooves 14a, and then matched and connected with a fixed optical fiber 15 by means of lowering the V-shaped groove 14a facing (front) end of arm member 35. Hence, when arm member 35 is returned to the horizontal position, movable optical fiber 16 straightens due to its intrinsic rigidity, thereby canceling the joint connection. This action is conducted by rotating off-center cam 43 which is coupled to the (rear) end of arm member 35 opposite the V-shaped grooves 14a. A cylindrical roll 37 (diameter 8 mm) is installed in a rotatable manner in the rear end of arm member 35; this rotary roll is coupled by means of contact to off-center cam 43.

Figure 4:
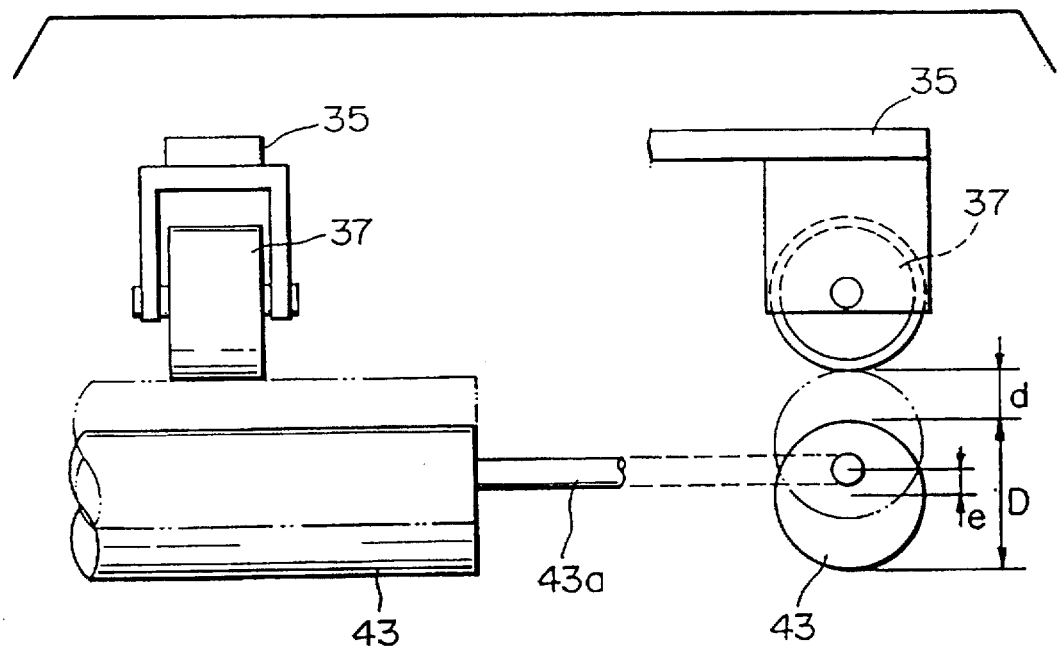
FIG. 4 is a diagram for use in describing the operation of a cam for raising and lowering an arm member of an optical switch apparatus according to the present invention.
Figure 5:
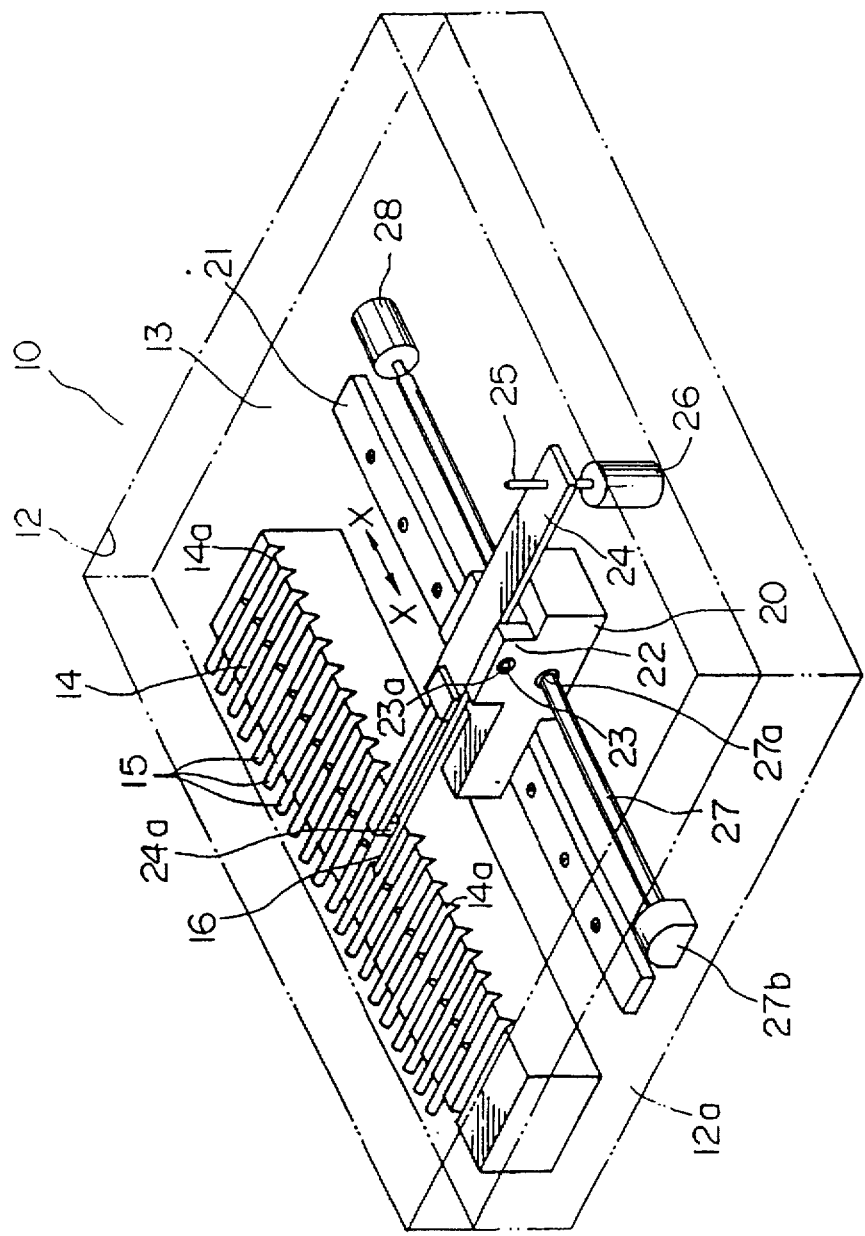
FIG. 5 is a diagram showing an outline of the experimental structure of a mechanical optical switch apparatus according to the conventional technology.

Off-center cam 43 is a cylinder of diameter 8 mm into which a rotary axle 43a is installed in a 1.5 mm off-centric manner corresponding to "e" in FIG. 4. When rotary axle 43a is positioned above the central axis of the cylindrical off-center cam 43 as shown by the solid circular line in FIG. 4, arm member 35 lies in the horizontal position. On the other hand, when rotary axle 43a is rotated by means of the driving member of off-center cam 43, off-center cam 43 is rotated, and cylindrical roll 37 at the rear end of arm member 35 is raised by means of off-center cam 43 as shown by the dotted circular line of FIG. 4. As a result, the tip of arm member 35 is driven in the downward direction thereby depressing movable optical fiber 16. Since pin 33, serving as the fulcrum of arm member 35, is positioned at the approximate center of arm member 35, the tip of arm member 35 is lowered only by the same amount that the rear end of arm member 35 is raised. This raised state generated by means of arm member 35 and cylindrical roll 37 at the rear end of arm member 35 is also shown in FIG. 4.

One end of the aforementioned rotary axle 43a, installed in an off-centric manner at both ends of off-center cam 43, is supported by means of roller bearing 46 installed in container wall 12a, while the other end is connected to a motor 44 (i.e., cam driving member) via oil seal 44a provided in the container wall 12a opposite container wall 12a in which roller bearing 46 is installed. In other words, the cam-driving motor 44, in the same manner as motor 41 for driving the worm gear, is provided outside of container 12.

Furthermore, modifications regarding off-center cam 43 are possible, as for example, it is possible to use a flat cross-sectional axle instead of the aforementioned circular cross-sectional axle.

FIG. 3A is a plane figure showing an optical switch apparatus according to the present invention. FIG. 3B is a side view of the same optical switch apparatus.

In FIG. 3A, although the V-shaped grooves 14a in the middle section of V-groove base 14 have been omitted, there is actually a plurality of V-shaped grooves 14a onto which fixed optical fibers have been placed over the entire surface (also omitted from the figure). In addition, as shown in FIG. 3A, motor 41 for rotating worm gear 38 and motor 44 for rotating the cam shaft are both provided outside of container 12 containing silicone oil 13 via oil seals 41a and 44a, respectively.

In addition, as shown in FIG. 3B, a lid 50 is placed over container 12 to protect the container from entry of dust particles and the like.

Furthermore, according to the aforementioned embodiment, two movable optical fibers 16 are provided on movable base 31; however, it is also possible to provide more than two movable optical fibers by means of spacing these movable optical fibers on movable base 31 at identical intervals to the plurality of optical fibers provided on V-shaped grooves 14a.

In the following, an optical switching procedure will be concretely explained using the aforementioned optical switch apparatus A.

Fixed optical fibers 15 are introduced from a connector housed in a connector shelf (not shown in the figures) normally in the vicinity of optical switch apparatus A. and arranged and fixed on V-shaped grooves 14a. Movable optical fiber 16 is placed on movable base 31.

After this movable base 31, onto which movable optical fibers 16 are placed, is precisely positioned at an operational origin 48 set near any of the worm gear 38 ends in the longitudinal direction, movable base 31 is moved to the desired position.

This movement of the movable base 31 is controlled by means of a control apparatus built into a control unit (control device), not shown in the figures, and a drive control apparatus (also not shown in the figures) which is similarly built into the control unit and controls the driving of motors 41 and 44.

In other words, initially after turning on the power, by means of an origin return command from the control apparatus, the drive control apparatus rotates worm gear motor 41, and returns movable base 31 back to the origin at a slow speed. The return of movable base 31 to the origin is conducted at a slow speed only in response to the first origin return command following the "power on" operation, such that a precise return to the origin, without overshoot, is possible. The origin position is detected by means of a high precision optical or magnetic switch.

After detecting the aforementioned origin 48, the automatic control system of movable base 31 is activated, and the initial positioning is started. At this time, according to the control apparatus, in order to connect movable optical fiber 16 to a fixed optical fiber 15 arranged on the Mth V-shaped groove 14a from origin 48, the movement amount of movable base 31 is first calculated, and the rotational amount of worm gear 38 in response to this movement amount is then calculated and the corresponding data is sent to the aforementioned drive control apparatus. The pulse output of the drive control apparatus is outputted to worm gear motor 41 which is directly coupled to an end of worm gear 38. Worm gear motor 41 is a stepping motor; accurate positioning of movable base 31 is possible by means of returning the position detected by means of a rotary encoder (not shown in the figure) to the drive control apparatus. The object of the rotary encoder is mainly to detect "step outs" of the pulse motor, i.e., worm gear motor 41. A predetermined pulse amount is outputted to worm gear motor 41, and movable base 31 stops at this position in the case when the driving of the predetermined pulse amount has been completed.

More concretely, for example, if a command signal is received by the automatic control system indicating connection with the tenth fixed optical fiber 15 on the right side from point zero, the drive amount corresponding to the required rotational amount of worm gear 38 is calculated based on the step angle of stepping motor 41, and motor 41 for rotating worm gear 38 is then step-driven. In this manner, when worm gear 38 is subsequently rotated, movable base 31 is moved to the position of the tenth fixed optical fiber 15 on the right side, and the predetermined drive amount of worm gear motor 41 is completed, the stepping motor (i.e., worm gear motor 41) is simultaneously placed on "hold" and movement of movable base 31 is stopped.

Subsequently, by means of a cam axle control signal from the control apparatus, off-center cam 43 is rotated when a signal output is provided to cam rotary motor 44, which is coupled to off-center cam 43 by means of the drive control apparatus. Normally, when optical fibers 15 and 16 are not being matched (joined), off-center cam 43 and arm member 35 are not in contact; however, when off-center cam 43 is rotated, off-center cam 43 comes into contact with and raises arm member 35. In this manner, following confirmation of the above position, cam rotary motor 44 starts operation thereby raising the rear end and depressing the front (tip) end of arm member 35. As a result, the end face of movable optical fiber 16 supported by the lower portion of arm member 35 is aligned facing the end face of the aforementioned fixed optical fiber 15 within the corresponding V-shaped groove 14a, and these optical fibers 15 and 16 are then connected. At this time, the joined optical fibers 15 and 16 are immersed in the silicone oil 13, an thus the indices of refraction are matched.

In addition, at this same time, an optical pulse is introduced into fixed optical fiber 15 from a measuring device (not shown in the figures) via movable optical fiber 16 to detect whether or not any interference of the optical path of fixed optical fiber 15 exists due to scattered light therein. Furthermore, in the aforementioned, two simple movable optical fibers 16 are loaded onto movable base 31; however, it is also possible to provide more than two movable optical fibers 16 onto movable base 31.

Following completion of the above-described measurement, by means of a cam axle control signal from the control apparatus, off-center cam 43 is rotated when a signal output of the drive control apparatus is provided to cam rotary motor 44. The tip member of movable optical fiber 16 can be raised and returned to the horizontal position by means of rotating off-center cam 43 in a reciprocal direction, thereby dissolving the connection with fixed optical fiber 15.

When the connection between optical fibers 15 and 16 is canceled, movable base 31 enters a standby mode at the same position to await the start of the next positioning sequence. Alternatively, worm gear motor 41 can be activated by means of an origin return command from the control apparatus, which in turn results in the return of movable base 31 to the origin at a high speed to await the start of the next positioning sequence.

As described in the aforementioned, a connection between a fixed optical fiber 15 and movable optical fiber 16 is established by means of depressing a tip of movable optical fiber 16 which has been moved to a position directly above the tip of a fixed optical fiber 15, and then pushing the aforementioned tip of movable optical fiber 16 into the tip of a fixed optical fiber 15 on the appropriate V-shaped groove 14a. Consequently, according to the present invention, it is possible to obtain stable, excellent connection properties with little scattering thereof. In addition, the connection is established within an index-of-refraction matching agent, i.e., silicone oil 13, and thus even, for example, in the case when the matching of the contact surfaces of the optical fibers 15 and 16 is not optimal due to tilting, shifting, etc., it is still possible to reduce the connection loss by matching the indices of refraction by means of the aforementioned index-of-refraction matching agent.

According to the optical switch apparatus of the present invention, a movable optical fiber 16 provided on movable optical fiber 31 is moved to the position of a predetermined fixed optical fiber 15 and depressed downward by means of arm member 35, and then matched with the aforementioned fixed optical fiber 15 to form a connection thereof. As a result, a precise connection is possible despite the relatively simple nature of the device. In addition, since the time required to form the connection is extremely short, it is also possible to achieve a rapid response time.

Furthermore, the optical switch apparatus of the present invention is essentially housed in an air-tight container with both motors 41 and 44 (i.e., the sources of contamination of the index-of-refraction matching agent) provided outside of the container. Thus, it is possible to almost completely prevent contamination of the silicone oil 13 by the external atmosphere. As a result, a highly reliable optical switch apparatus is possible in which an excellent connection and stable connection properties can be maintained over a long period of time, even when repeatedly switching the connections.

What is claimed is:

1. An optical switch apparatus for matching and bringing into communicative proximity an end of a movable optical fiber and an end of a fixed optical fiber selected from among a plurality of fixed optical fibers, said optical switch apparatus comprising:

a container containing an index-of-refraction matching agent for immersing a junction between a fixed optical fiber and a movable optical fiber in communicative proximity;

a fixed optical fiber support means for supporting each end of said plurality of fixed optical fibers within said container so that each fixed optical fiber is matchable and able to be brought into communicative proximity to an end of said movable optical fiber;

a movable optical fiber base means for moving an end of said movable optical fiber into a standby position for matching with one of said plurality of fixed optical fibers and into a proximal position in communicative proximity with said one of said fixed optical fibers;

a moving means for moving the movable optical fiber base means, the moving means comprising a worm gear installed in said movable base and a worm gear driving means for driving said worm gear the worm gear driving means positioned on the outside of the container; and a matching means for moving said movable optical fiber to a standby position, matching the movable optical fiber with said one of said fixed optical fibers, and controlling the moving means to move the movable optical fiber base means to bring said movable optical fiber into communicative proximity with said one of said fixed optical fibers.

2. An optical switch apparatus according to claim 1, wherein said matching means comprises an arm member provided in said movable base in a rotatable manner, an off-center cam coupled to an end of said arm member for rotating said arm member, and a cam driving means for driving said off-center cam, such that said cam driving means for rotating said arm member of said matching means is provided on the outside of said container via a seal.

3. An optical switch apparatus according to claim 2, wherein at the start of positioning, said movable base means returns to a predetermined origin in said container before proceeding to a standby position for matching and bringing fibers into communicative proximity.

4. An optical switch apparatus according to claim 2, wherein said optical fiber support means comprises a positioning groove base for supporting said optical fibers by means of a plurality of positioning grooves aligned in parallel array.

5. An optical switch apparatus according to claim 2, wherein said matching means comprises a structure in which a tip of said movable optical fiber is supported by means of an end of said arm member, with the other end of said arm member coupled to said off-center cam such that said tip of said movable optical fiber is connected and disconnected with a fixed optical fiber by means of raising and lowering said tip of said movable optical fiber by means of rotational driving of said off-center cam.

6. An optical switch apparatus according to claim 5, said tip of said movable optical fiber is supported in a projecting manner from said end of said arm member, such that upon pressing said tip of said movable optical fiber onto said optical fiber supports means, said tip of said movable optical fiber is bent, matched and connected with a fixed optical fiber.

7. An optical switch apparatus according to claim 2, wherein a plurality of said movable optical fibers are supported by said arm member of said matching means.

8. An optical switch apparatus according to claim 2, wherein rotational driving of said worm gear is controlled by means of a stepping motor housed in a worm gear driving means, and said stepping motor is designed to conduct step driving by a drive amount calculated based on a step angle corresponding to a required rotational amount of said worm gear.

9. An optical switch apparatus according to claim 8, wherein said rotational amount of said worm gear is calculated from a distance between a predetermined origin within said container and a desired moving position of said movable base.

* * * * *